US010519867B2

(12) United States Patent
Simonetti et al.

(10) Patent No.: US 10,519,867 B2
(45) Date of Patent: Dec. 31, 2019

(54) INTEGRATED INLET PARTICLE SEPARATOR (IPS) BLOWER/ENGINE STARTER

(71) Applicant: SIKORSKY AIRCRAFT CORPORATION, Stratford, CT (US)

(72) Inventors: Joseph Lawrence Simonetti, Southbury, CT (US); Andrew G. Keith, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 302 days.

(21) Appl. No.: 15/717,125

(22) Filed: Sep. 27, 2017

(65) Prior Publication Data

US 2019/0093558 A1   Mar. 28, 2019

(51) Int. Cl.
| F02C 7/277 | (2006.01) |
| F02C 7/275 | (2006.01) |
| F01D 19/00 | (2006.01) |
| F02C 7/05 | (2006.01) |
| F02C 7/052 | (2006.01) |
| B64D 33/02 | (2006.01) |
| F02C 7/26 | (2006.01) |
| F02C 7/36 | (2006.01) |

(52) U.S. Cl.
CPC ............. *F02C 7/277* (2013.01); *F01D 19/00* (2013.01); *F02C 7/275* (2013.01); *B64D 2033/0246* (2013.01); *F02C 7/05* (2013.01); *F02C 7/052* (2013.01); *F02C 7/26* (2013.01); *F02C 7/36* (2013.01); *F05D 2220/329* (2013.01); *F05D 2260/607* (2013.01); *F05D 2260/85* (2013.01)

(58) Field of Classification Search
CPC .. F02C 7/05; F02C 7/052; F02C 7/277; F02C 7/27; F02C 7/26; F02C 7/268; F02C 7/275; F02C 6/08; F01D 19/00; F01D 1/30; B64D 2033/0246; B64D 2033/022; F05D 2260/85
See application file for complete search history.

(56) References Cited

U.S. PATENT DOCUMENTS

| 2,692,476 | A | * | 10/1954 | Lawler | ...................... | F01D 1/30 |
| | | | | | | 60/788 |
| 3,145,532 | A | * | 8/1964 | Moss | ...................... | F02C 7/277 |
| | | | | | | 60/788 |
| 9,982,599 | B2 | * | 5/2018 | Suciu | ...................... | F02C 7/052 |
| 10,100,744 | B2 | * | 10/2018 | Mackin | ...................... | F02C 6/08 |
| 2012/0131900 | A1 | | 5/2012 | Kenyon et al. | | |
| 2017/0370287 | A1 | * | 12/2017 | Pearson | ................. | B01D 45/04 |

\* cited by examiner

*Primary Examiner* — Craig Kim
*Assistant Examiner* — Stephanie Cheng
(74) *Attorney, Agent, or Firm* — Cantor Colburn LLP

(57) ABSTRACT

An integrated inlet particle separator (IPS) blower/engine starter including a housing having an inlet and an outlet. A turbine member is rotatably supported in the housing. A geared member operatively connected to the turbine member extends outward from the housing. The integrated IPS blower/engine starter is operable in a first configuration receiving a first fluid flow to rotate the geared member and in a second configuration generating a fluid flow through powered rotation of the geared member.

9 Claims, 1 Drawing Sheet

INTEGRATED INLET PARTICLE SEPARATOR (IPS) BLOWER/ENGINE STARTER

BACKGROUND

Exemplary embodiments pertain to the art of engines and, more particularly, to an integrated inlet particle separator (IPS) blower/engine starter.

Many vehicles include a prime mover that is coupled to a gearbox. The gearbox is coupled to a driving member such as wheels, rotors and the like. Certain vehicles, such as aircraft, may include an engine starter coupled to a prime mover accessory gearbox. The engine starter may take the form of a turbomachine that is powered by a stream of fluids, such as high velocity air, delivered from an auxiliary power unit (APU), another engine or the like. The stream of fluids act upon the engine starter to initiate operation of the prime mover.

Prime movers, such as those employed in aircraft, may also include an inlet particle separator (IPS) blower coupled to the prime mover accessory gearbox. The IPS employs a cyclonic stream of fluids, such as air, to separate particles from an inlet airflow. The stream of air is generated by the IPS blower. The inlet airflow is then passed to the prime mover substantially particle free. The substantially particle free air flow reduces wear on prime mover components. However, the need for a separate IPS blower and starter adds weight to the vehicle and increases parts inventory costs.

BRIEF DESCRIPTION

Disclosed is an integrated inlet particle separator (IPS) blower/engine starter including a housing having an inlet and an outlet. A turbine member is rotatably supported in the housing. A geared member operatively connected to the turbine member extends outward from the housing. The integrated IPS blower/engine starter is operable in a first configuration receiving a first fluid flow to rotate the geared member and in a second configuration generating a fluid flow through powered rotation of the geared member.

In addition to one or more of the features described above or below, or as an alternative, further embodiments could include an inlet conduit coupled to the inlet, the inlet conduit including a first valve fluidically connectable to an IPS and a second valve fluidically connectable to an engine starting system.

Also disclosed is a vehicle including a prime mover, an engine accessory gearbox coupled to the prime mover, an inlet particle separator fluidically connected to the prime mover, and an integrated inlet particle separator (IPS) blower/engine starter including a housing having an inlet and an outlet. A turbine member is rotatably supported in the housing. A geared member operatively connected to the turbine member extends outward from the housing and mechanically connects to the engine accessory gearbox. The integrated IPS blower/engine starter is operable in a first configuration receiving a first fluid flow to rotate the geared member and initiate activation of the prime mover and in a second configuration generating a fluid flow through powered rotation of the geared member by the prime mover.

In addition to one or more of the features described above or below, or as an alternative, further embodiments could include an inlet conduit coupled to the inlet, the inlet conduit including a conduit having a first valve fluidically connected to the IPS and a second conduit having a second valve fluidically connectable to an engine starting system.

In addition to one or more of the features described above or below, or as an alternative, further embodiments could include a plurality of rotor blades operatively connected with the prime mover.

Further disclosed is a method of operating a vehicle including operating an integrated inlet particle separator (IPS) blower/engine starter in a first configuration comprising passing a first fluid flow from an engine starting system into the integrated IPS blower/engine starter to rotate an engine accessory gearbox and initiate activation of a prime mover, and operating the IPS blower/engine starter in a second configuration comprising driving a turbine portion of the IPS blower/engine starter with the prime mover to generate an IPS flow.

In addition to one or more of the features described above or below, or as an alternative, further embodiments could include wherein passing the first fluid flow into the integrated IPS blower/engine starter includes opening a first valve fluidically connected to an inlet of the IPS blower and engine starter.

In addition to one or more of the features described above or below, or as an alternative, further embodiments could include wherein passing the second fluid flow into the integrated IPS blower/engine starter includes opening a second valve fluidically connected between an engine starting system and the inlet of the integrated IPS blower/engine starter.

In addition to one or more of the features described above or below, or as an alternative, further embodiments could include wherein rotating the prime mover includes driving an engine accessory gearbox mechanically connected between the turbine portion and the prime mover.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
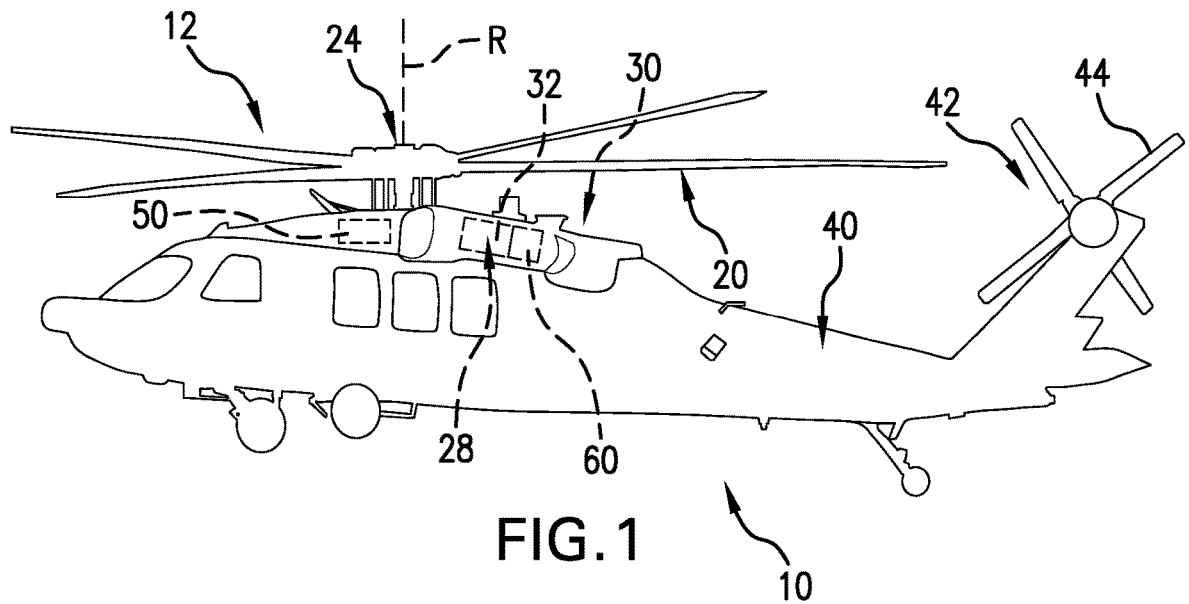
FIG. 1 depicts a vehicle, in the form of a vertical take-off and landing (VTOL) aircraft including an integrated inlet particle separator (IPS) blower/engine starter, in accordance with an aspect of an exemplary embodiment.

FIG. 1 depicts a vertical takeoff and landing (VTOL) aircraft 10 including a main rotor system 12, which rotates about a main rotor axis R. Main rotor system 12 includes a plurality of rotor blades 20. Plurality of rotor blades 20 is mounted to a rotor hub 24. Main rotor system 12 is driven by a gearbox 28 coupled to one or more prime movers, indicated generally at 30. Prime mover(s) 30 may also be coupled to a prime mover or engine accessory gearbox 32. Aircraft 10 includes an extending tail 40 that supports a tail rotor system 42 including a plurality of tail rotor blades, indicted generally at 44. Tail rotor system 42 may be operatively coupled to gearbox 28 through a drive shaft (not shown). An inlet particle separator (IPS) system 50 is provided on aircraft 10. IPS system 50 removes particulate matter from an airstream passing to the one or more prime movers 30.

Figure 2:
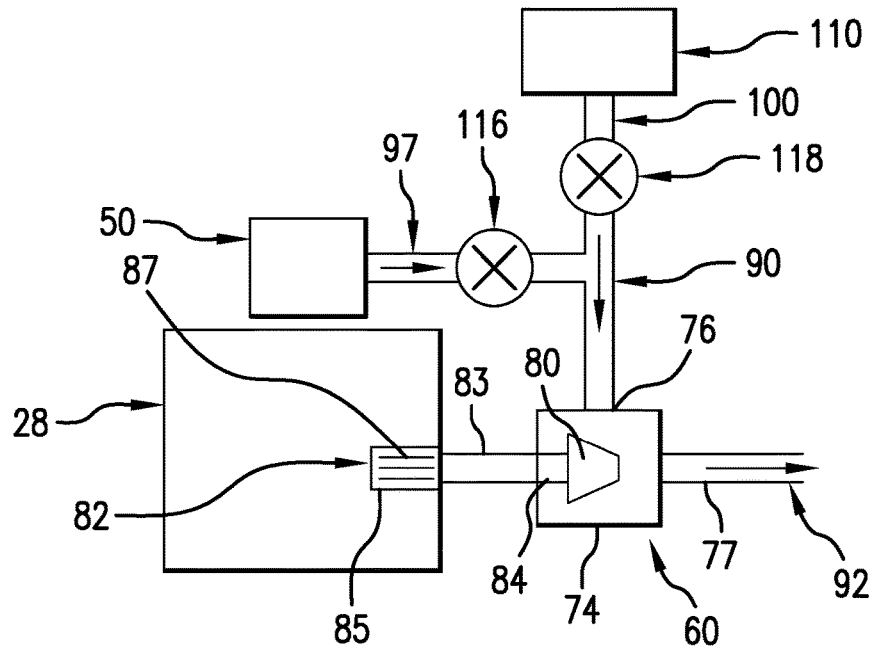
FIG. 2 depicts a block diagram illustrating the integrated IPS blower/engine starter, in accordance with an exemplary embodiment.

In accordance with an exemplary aspect, vehicle 10 includes an integrated IPS blower/engine starter 60 operatively connected to engine accessory gearbox 32. Referring to FIG. 2, integrated IPS blower/engine starter 60 includes a housing 74 having an inlet 76 and an outlet 77. Housing 74 supports a turbine member 80 operatively connected to a geared member 82. Geared member 82 includes a shaft 83, a first end 84 and a second end 85. First end 84 is mechanically connected to turbine member 80, and second end 85 supports a gear element 87 that is mechanically linked to a gear system (not shown) arranged in engine accessory gearbox 32.

In further accordance with an exemplary embodiment, an inlet conduit 90 is connected to inlet 76 and an outlet conduit 92 is connected to outlet 77. Outlet conduit 92 may deliver fluids passing through integrated IPS blower/engine starter 60 to ambient. A first branch conduit 97 is fluidically connected between IPS 50 and inlet conduit 90. A second branch conduit 100 may be selectively connected between inlet conduit 90 and an engine starting system 110. Engine starting system 110 may take on a variety of forms including an auxiliary power unit (APU), another engine, another aircraft, and the like.

In still further accordance with an exemplary embodiment, a first valve 116 may be fluidically connected with first branch conduit 97 and a second valve 118 may be fluidically connected to second branch conduit 100. Integrated IPS blower/engine starter 60 may be operated in a first configuration or starting mode and in a second configuration or IPS blower mode in accordance with an exemplary aspect. In the first configuration, engine starting system 110 is connected to second branch conduit 100. First valve 116 is closed and second valve 118 is opened. A stream of fluids, such as pressurized air, is passed into housing 74 and interacts with turbine member 80. Turbine member 80 drives engine accessory gearbox 32 to start rotation of prime mover(s) 30. The fluids passing through housing 74 may be directed to ambient.

In the second configuration, integrated IPS blower/engine starter 60 may be operated to generate an airflow for IPS system 50. More specifically, in the second configuration, first valve 116 is opened and second valve 118 is closed. Engine accessory gearbox 28 drives turbine member 80 to create a fluid flow. The fluid flow draws in an airflow through IPS system 50. The airflow is cleaned of entrained particulate in IPS system 50 and passed from prime movers 30. Thus, it should be understood that the exemplary embodiments describe a system that can both promote engine starting and generate an airflow for the IPS system. By combining two systems into a single unit, the exemplary embodiment reduces vehicle weight, parts inventory and maintenance.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best configuration contemplated for carrying out this present disclosure, but that the present disclosure will include all embodiments falling within the scope of the claims.

What is claimed is:

1. An integrated inlet particle separator (IPS) blower/engine starter including an inlet particle separator (IPS) comprising:
   a housing including an inlet and an outlet;
   a turbine member rotatably supported in the housing;
   a geared member operatively connected to the turbine member and extending outward from the housing,
   wherein the integrated IPS blower/engine starter is operable in a first configuration to receive a first fluid flow passing from the inlet and across the turbine member to the outlet in order to drive rotation of the geared member and initiate activation of a prime mover; and
   wherein the integrated IPS blower/engine starter is operable in a second configuration, through powered rotation of the geared member by the prime mover, to rotate the turbine member and generate a second fluid flow through the IPS into the inlet of the housing across the turbine member and through the outlet of the housing.

2. The integrated IPS blower/engine starter according to claim 1, further comprising: an inlet conduit coupled to the inlet, the inlet conduit including a first valve fluidically connected to the IPS and a second valve fluidically connected to an engine starting system.

3. A vehicle comprising:
   a prime mover;
   an engine accessory gearbox coupled to the prime mover;
   an inlet particle separator (IPS) fluidically connected to the prime mover; and
   an integrated inlet particle separator (IPS) blower/engine starter comprising:
   a housing including an inlet and an outlet;
   a turbine member rotatably supported in the housing; and
   a geared member operatively connected to the turbine member, extending outward from the housing, and mechanically connected to the engine accessory gearbox,
   wherein the integrated IPS blower/engine starter is operable in a first configuration to receive a first fluid flow passing from the inlet and across the turbine member to the outlet in order drive rotation of the geared member and initiate activation of the prime mover, and
   wherein the integrated IPS blower/engine starter is operable in a second configuration through powered rotation of the geared member by the prime mover, to rotate the turbine and generate a second fluid flow through the IPS into the inlet of the housing and across the turbine member to the outlet of the housing.

4. The vehicle according to claim 3, further comprising: an inlet conduit coupled to the inlet, the inlet conduit including a first conduit having a first valve fluidically connected to the IPS and a second conduit having a second valve fluidically connectable to an engine starting system.

5. The vehicle according to claim 3, further comprising:
a plurality of rotor blades operatively connected with the prime mover.

6. A method of operating a vehicle comprising:
operating an integrated inlet particle separator (IPS) blower/engine starter in a first configuration comprising:
generating a first fluid flow with an engine starting system, the first fluid flow passing into an inlet of the integrated IPS blower/engine starter to rotate a turbine member connected to an engine accessory gearbox and initiate activation of a prime mover; and
operating the integrated IPS blower/engine starter in a second configuration comprising:
driving the turbine member of the integrated IPS blower/engine starter with the prime mover to generate an IPS flow from an inlet particle separator (IPS) into the inlet of the integrated IPS blower/engine starter.

7. The method of claim 6, wherein passing the first fluid flow into the integrated IPS blower/engine starter includes opening a first valve fluidically connected to the inlet of the integrated IPS blower/engine starter and the engine starting system.

8. The method of claim 7, wherein passing the IPS flow into the integrated IPS blower/engine starter includes opening a second valve fluidically connected between the IPS and the inlet of the integrated IPS blower/engine starter.

9. The method of claim 6, wherein initiating activation of the prime mover includes driving the engine accessory gearbox mechanically connected between the turbine member and the prime mover.

* * * * *